United States Patent
Low et al.

(10) Patent No.: US 9,436,647 B2
(45) Date of Patent: Sep. 6, 2016

(54) IIC BUS START-STOP DETECTION CIRCUIT

(71) Applicant: STMicroelectronics Asia Pacific Pte. Ltd., Singapore (SG)

(72) Inventors: Nee Loong Wilson Low, Singapore (SG); Chaochao Zhang, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 540 days.

(21) Appl. No.: 14/026,375

(22) Filed: Sep. 13, 2013

(65) Prior Publication Data
US 2015/0081936 A1  Mar. 19, 2015

(51) Int. Cl.
*G06F 13/42* (2006.01)

(52) U.S. Cl.
CPC ........... *G06F 13/4282* (2013.01); *G06F 13/42* (2013.01); *G06F 13/4291* (2013.01); *G06F 2213/0016* (2013.01)

(58) Field of Classification Search
USPC ............................ 710/105, 110, 305; 326/93
See application file for complete search history.

(56) References Cited

U.S. PATENT DOCUMENTS

| | | | |
|---|---|---|---|
| 5,878,234 A * | 3/1999 | Dutkiewicz et al. | 710/110 |
| 5,903,737 A * | 5/1999 | Han | 710/100 |
| 6,530,029 B1 | 3/2003 | Metchev | |
| 7,174,473 B2 | 2/2007 | Musumeci et al. | |
| 2004/0010728 A1* | 1/2004 | Musumeci et al. | 713/400 |
| 2007/0125853 A1* | 6/2007 | Liu | 235/439 |
| 2014/0095750 A1* | 4/2014 | Tailliet | 710/105 |
| 2014/0312929 A1* | 10/2014 | Fullerton | 326/35 |

* cited by examiner

*Primary Examiner* — Khanh Dang
(74) *Attorney, Agent, or Firm* — Gardere Wynne Sewell LLP

(57) ABSTRACT

A start/stop condition detection circuit is coupled to receive the SDA and SCL signals from an IIC Bus. The circuit generates a first signal in response to an edge of the SDA signal and generates an inversion of the first signal as a second signal in response to an opposite edge of the SCL signal. The first and second signals are logically combined to generate an output signal. The particular directions of the edges of the SDA and SCL signals that the circuit is response to determines whether the output signal is indicative of a start condition detection or a stop condition detection.

26 Claims, 4 Drawing Sheets

IIC BUS START-STOP DETECTION CIRCUIT

TECHNICAL FIELD

The present invention relates to the Inter-Integrated Circuit (IIC or I²C) Bus and a circuit configured to detect the start condition and stop condition.

BACKGROUND

The Inter-Integrated Circuit (IIC or I²C) bus and the associated IIC protocol were developed in the 1980s to make it easy to connect electronic systems together. Initially designed for home equipment, this bus protocol has now become a preferred means of configuring complex electronic components.

The IIC protocol can be used to set up communications between a variety of electronic components by means of a bus that conveys only three signals: a data signal SDA containing data and/or addresses to be transmitted, a clock signal SCL setting the rate of the signal SDA, and an electrical reference (ground) signal.

This makes it possible to obtain equipment with very powerful functions (provided with all the power of microprogrammed systems) while keeping a printed circuit board that is very simple as compared with one having a classic circuit diagram.

The IIC protocol defines the succession of possible logic states on the signals SDA and SCL associated with an IIC bus connecting at least two electronic components that have to communicate.

Each electronic component connected to the bus constantly monitors the signals SDA and SCL in order to determine: if the bus is free, if the data transmitted on the bus is addressed for it (in the case of the slave electronic component), and if the data that it transmits is accurately transmitted (in the case of the master electronic component).

To take control of the bus in order to transmit data, the electronic component must initially determine that the bus is at rest. This corresponds to the state where the signals on both the SDA and SCL lines are both logic high (i.e., equal to logic "1").

After the electronic component verifies that the bus is free, it may take control of the bus: this electronic component then becomes the master and imposes the clock signal SCL. It can then transmit data to one or more slave electronic components connected to the bus. Within the data communications procedure of the IIC bus specification, two unique situations arise which are defined as the IIC start condition and the IIC stop condition.

To transmit one byte of data on the free bus, the master transmits a start condition message on the signal SDA. The IIC start condition occurs when the SDA data signal transitions from a high logic state to a low logic state when the SCL clock signal is logic high. This start condition message indicates that the data will be transmitted. It is followed by a data byte to be transmitted and an enabling bit (where the SDA signal is equal to logic "1"). During this phase, a leading edge of the clock signal SCL enables each bit sent on the signal SDA. The slave (the addressee of the transmitted byte) then imposes a "0" on the signal SDA, thus, informing the master that it has accurately received the transmitted byte. Finally, the master transmits a stop condition signal on the signal SDA, to indicate that the bus will be released. The IIC stop condition occurs when the SDA data signal transitions from a low logic state to a high logic state when the SCL clock signal is logic high.

Reference is now made to FIG. 1 which illustrates the timing of signal transitions on the SCL and SDA lines of the IIC bus in connection with the start condition and the stop condition. The start condition is fulfilled when the following conditions occur: with the signals SDA and SCL initially at logic "1" (bus idle, instant t1), the signal SDA goes to logic "0" (instant t2) while the signal SCL remains at logic "1" for at least a time TDLC after the trailing edge of the signal SDA (instant t3). If necessary, a minimum time may be required between the last leading edge of SCL (instant t1) and the trailing edge of SDA (instant t2) to ensure that the bus is available. The stop condition is fulfilled when the following conditions occur: with the signal SDA initially at logic "0" and the signal SCL initially at logic "1" (instant t4), the signal SDA goes to logic "1" (instant t5) while the signal SCL remains at logic "1" (instant t6). As the case may be, a minimum time may be required between the leading edge of SCL (instant t4) and the leading edge of SDA (instant t5).

To monitor the SDA and SCL signals on the bus, an electronic component connected to the bus may use an interface circuit (for example, an asynchronous digital logic circuit) specifically configured for the detection of the start and stop conditions. This interface circuit may identify the start condition by sampling the level of the clock signal when the falling edge of the data signal is detected. However, glitches on the data line during arbitration in a multi-master environment may erroneously invalidate a previously detected IIC start condition. Furthermore, glitches on the data line while the IIC bus is in an idle state may be erroneously interpreted as an IIC start condition. This, in turn, can lead the interface to lock up and stall the bus.

Additionally, because of potential timing violations generated by SCL/SDA toggles, the included flip-flop circuitry may transition into a meta-stable state resulting in unpredictable flip-flop output signaling. As a consequence, the start and/or stop condition detection circuitry may not work properly. For example, when a new IIC transaction starts, the start condition detection circuitry may not recover immediately for the first data transaction.

To summarize, it is noted that when under a) very noisy conditions on the IIC bus or b) the presence of unpredictable toggling (not IIC start/stop) on the SCL/SDA lines of the IIC bus after the stop condition has been detected, the interface circuitry for start/stop condition detection may not function properly.

Thus, there is a need for an IIC interface circuit that addresses the foregoing and other problems associated with accurately detecting the start condition and stop condition.

SUMMARY

In an embodiment, a circuit comprises: a first input configured to receive an SDA signal; a second input configured to receive an SCL signal; a first logic circuit configured to generate a first signal having a first logic state in response to a rising edge of the SCL signal; a second logic circuit configured to invert the first signal and generate a second signal having a second logic state in response to a falling edge of the SDA signal; and a third logic circuit operable responsive to the first logic state of the first signal and second logic state of the second signal to generate a start signal indicative of a start condition on a bus comprising the SDA and SCL signals.

In an embodiment, a circuit comprises: a first input configured to receive an SDA signal; a second input configured to receive an SCL signal; a first logic circuit configured to generate a first signal having a first logic state in response to a falling edge of the SCL signal; a second logic circuit configured to invert the first signal and generate a second signal having a second logic state in response to a rising edge of the SDA signal; and a third logic circuit operable responsive to the first logic state of the first signal and second logic state of the second signal to generate a stop signal indicative of a stop condition on a bus comprising the SDA and SCL signals.

In an embodiment, a circuit comprises: a first input configured to receive an SDA signal; a second input configured to receive an SCL signal; a first circuit configured to sense a rising edge of the SCL signal and generate a first signal; a second circuit configured to sense a falling edge of the SDA signal and pass an inversion of the first signal as a second signal; and a logic circuit configured to logically combine the first and second signals to generate a start condition signal for a bus comprising the SDA and SCL signals.

In an embodiment, a circuit comprises: a first input configured to receive an SDA signal; a second input configured to receive an SCL signal; a first circuit configured to sense a falling edge of the SCL signal and generate a first signal; a second circuit configured to sense a rising edge of the SDA signal and pass an inversion of the first signal as a second signal; and a logic circuit configured to logically combine the first and second signals to generate a stop condition signal for a bus comprising the SDA and SCL signals.

In an embodiment, a circuit comprises: a first input configured to receive an SDA signal; a second input configured to receive an SCL signal; a start/stop condition detection circuit coupled to receive the SDA and SCL signals and configured to: generate a first signal in response to an edge of the SDA signal; generate an inversion of the first signal as a second signal in response to an opposite edge of the SCL signal; and logically combine the first and second signals to generate an output signal indicative of start/stop condition detection.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 2:
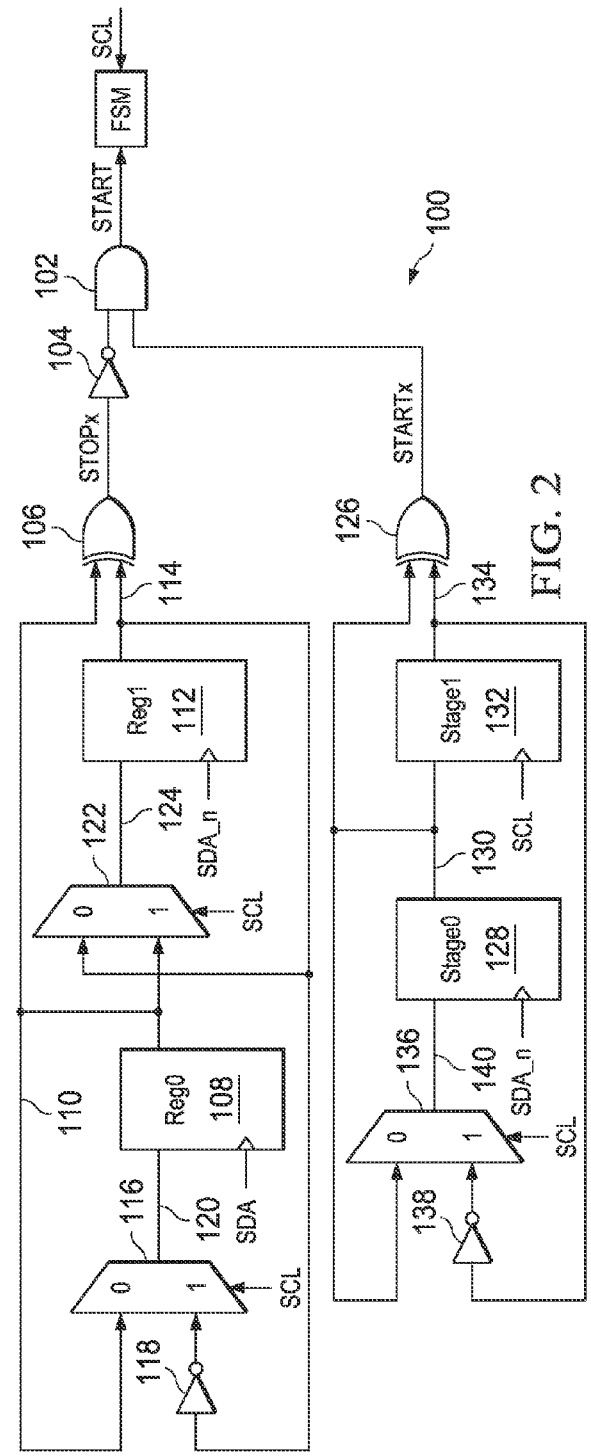
FIG. 2 is a circuit diagram for a start condition detection circuit.

Reference is now made to FIG. 2 wherein there is shown a circuit diagram for a start condition detection circuit 100. The START signal is generated by a logic AND gate 102 having a first input configured to receive an inverted 104 STOPx signal and a second input configured to receive a STARTx signal. A finite state machine (FSM) is configured to receive the START signal as well as the signal on the SCL line of the IIC Bus. At the rising edge of the SCL signal, the FSM will check the logic state of the START signal. When the START signal is logic high at the rising edge of the SCL signal, the FSM detects a start condition.

The STOPx signal is generated by a logic XOR gate 106. A flip-flop 108 (Reg0) has a data output (Q) supplying a signal 110 applied to a first input of the XOR gate 106. A flip-flop 112 (Reg1) has a data output (Q) supplying a signal 114 applied to a second input of the XOR gate 106. The Reg0 flip-flop 108 is clocked by the signal on the SDA line of the IIC Bus, and the Reg1 flip-flop 112 is clocked by the inversion SDA_n of the signal on the SDA line of the IIC Bus.

A multiplexor 116 has a first input configured to receive the signal 110 and a second input configured to receive an inversion 118 of the signal 114. The multiplexor 116 generates an output signal 120 applied to the data input of the Reg0 flip-flop 108. The multiplexor 116 functions to select either the signal 110 or the inversion 118 of the signal 114 for output as the output signal 120 in response to a select signal. The select signal is the signal on the SCL line of the IIC Bus.

A multiplexor 122 has a first input configured to receive the signal 114 and a second input configured to receive the signal 110. The multiplexor 122 generates an output signal 124 applied to the data input of the Reg1 flip-flop 112. The multiplexor 122 functions to select either the signal 114 or the signal 110 for output as the output signal 124 in response to a select signal. The select signal is the signal on the SCL line of the IIC Bus.

The STARTx signal is generated by a logic XOR gate 126. A flip-flop 128 (Stage0) has a data output (Q) supplying a signal 130 applied to a first input of the XOR gate 126. A flip-flop 132 (Stage1) has a data output (Q) supplying a signal 134 applied to a second input of the XOR gate 126. The Stage0 flip-flop 128 is clocked by the inversion SDA_n of the signal on the SDA line of the IIC Bus, and the Stage1 flip-flop 132 is clocked by the signal on the SCL line of the IIC Bus. The signal 130 output from the Stage0 flip-flop 128 is applied to the data input of the Stage1 flip-flop 132.

A multiplexor 136 has a first input configured to receive the signal 130 and a second input configured to receive an inversion 138 of the signal 134. The multiplexor 136 generates an output signal 140 applied to the data input of the Stage0 flip-flop 128. The multiplexor 136 functions to select either the signal 130 or the inversion 138 of the signal 134 for output as the output signal 140 in response to a select signal. The select signal is the signal on the SCL line of the IIC Bus.

In operation of the circuit 100, all flip-flops 108, 112, 128 and 132 are reset to output a logic low signal at power-up. A power on reset (POR) circuit, not shown but well known to those skilled in the art, can be used to generate a reset signal for application to a reset input (not shown) associated with each of the flip-flops 108, 112, 128 and 132.

Figure 1:
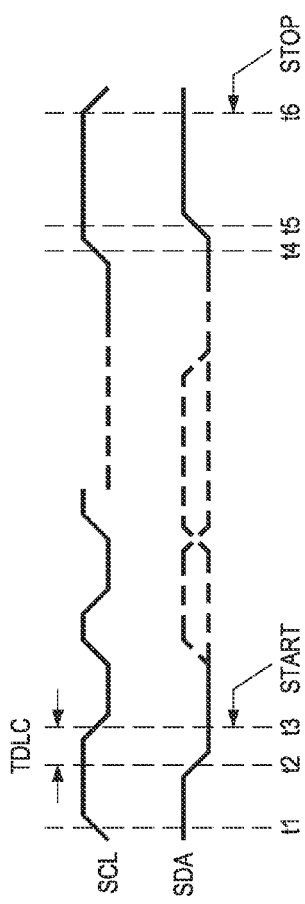
FIG. 1 illustrates the timing of signal transitions on the SCL and SDA lines in connection with the start condition and the stop condition.
Figure 3:
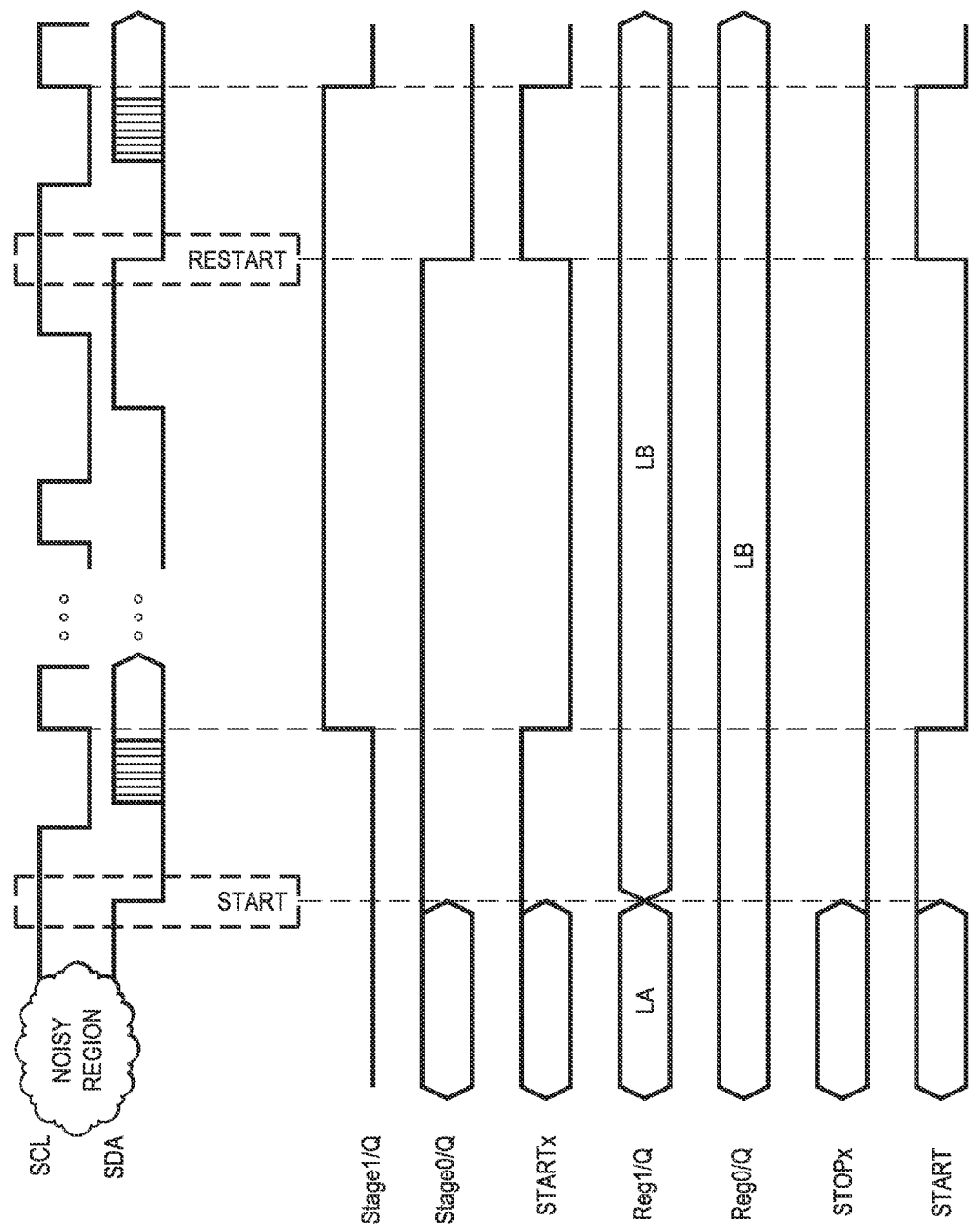
FIG. 3 illustrates a timing diagram for operation of the start condition detection circuit of FIG. 1.

Reference is now made to FIG. 3 which illustrates a timing diagram for operation of the circuit 100 of FIG. 1.

The generation of the START signal is mainly governed by the circuitry generating the STARTx signal.

The IIC start condition occurs when the inversion SDA_n of the signal on the SDA line of the IIC Bus transitions to logic high and the signal on the SCL line of the IIC Bus is also logic high. The multiplexor 136 will select the inversion 138 of the signal 134 output from the Stage1 flip-flop 132 for application to the data input of the Stage0 flip-flop 128. The transition of the SDA_n signal to logic high clocks the Stage0 flip-flop 128 and causes the signal 130 to have an opposite logic state from the signal 134. The XOR gate 126 responds to this input condition by generating the STARTx signal having a logic high data state. If the STOPx signal is logic low (see further description below), then the AND gate 102 will generate the START signal having the logic high data state of the STARTx signal. At the next rising edge of the SCL line of the IIC Bus, the Stage1 flip-flop 132 is clocked and the signal 134 will have the same logic state as the signal 130. The XOR gate 126 responds to this input condition by generating the STARTx signal having a logic low data state, causing the START signal to also have a logic low data state. When the signal on the SCL line of the IIC bus transitions to logic low, the multiplexor 136 selects the signal 130 output from the Stage0 flip-flop 128 for input back to the Stage0 flip-flop 128 to effectively latch the data state of the signal 130 until the signal on the SCL line of the IIC Bus next transitions back to logic high.

The references "LA" and "LB" in FIG. 3 represent signals having any logic value (high or low). In this context, LA may have the same logic value as LB or LA may have the opposite logic value as LB.

Figure 4:
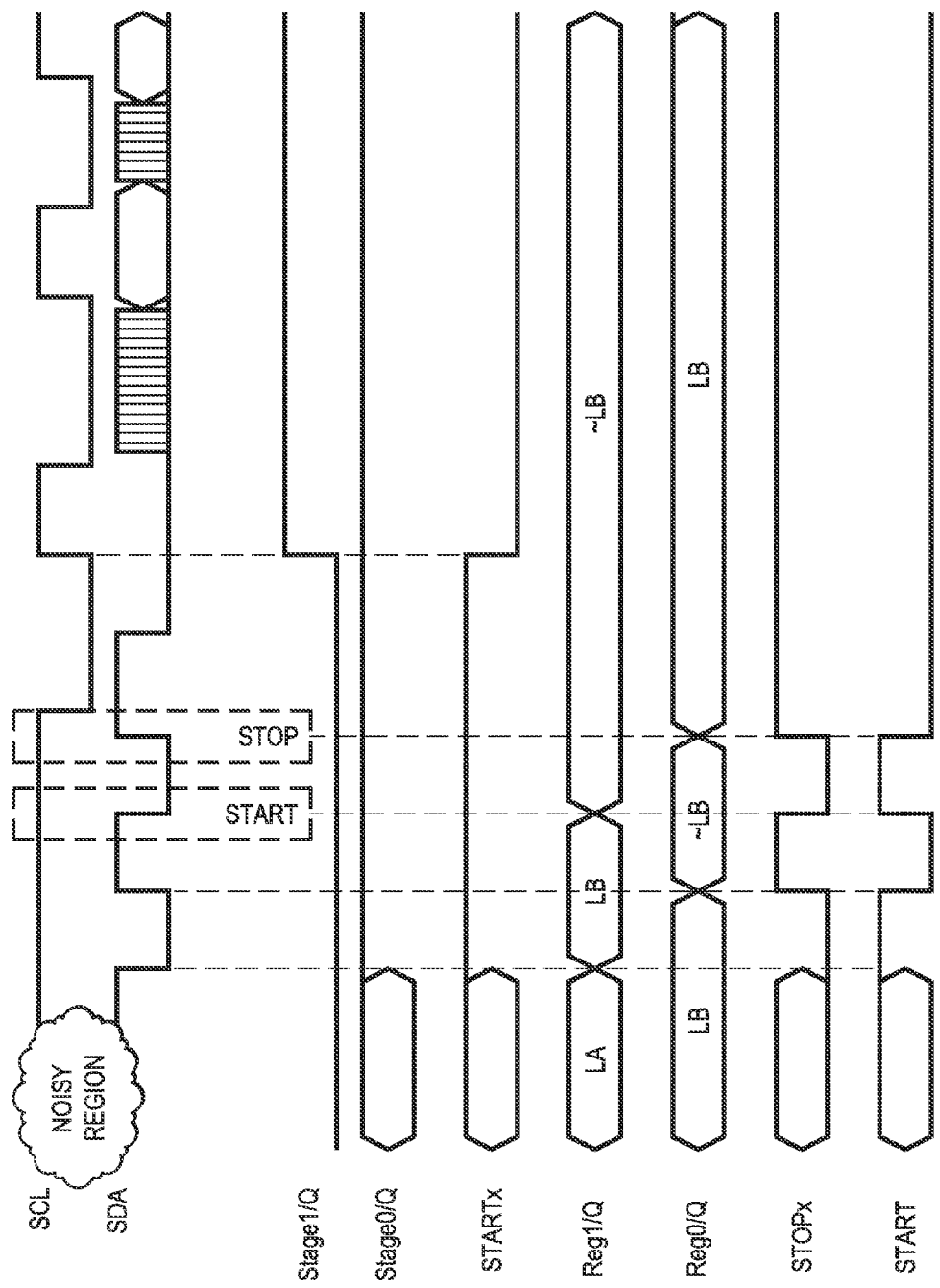
FIG. 4 illustrates a timing diagram for operation of the start condition detection circuit of FIG. 1.

Reference is now made to FIG. 4 which illustrates a further timing diagram for operation of the circuit 100 of FIG. 1.

The STOPx signal is pulled logic low in response to detection of a start condition and is pulled logic high in response to detection of a stop condition. The STOPx signal assists with the correct generation of the START signal in situations where a multi start/stop occurs with toggle on the SCL and/or SDA lines of the IIC Bus.

As discussed above, the STARTx signal is pulled logic low in response to the rising edge of the SCL signal clocking the operation of the Stage1 flip-flop 132 so that the signals 130 and 134 have the same logic state. Without the presence of the inverted STOPx signal at the other input of the AND gate 102, a false start could be detected by the FSM. With the STOPx signal, the START signal is pulled logic low before the rising edge of the SCL signal.

The STOPx signal is logic low when the two inputs of the XOR gate 106 have the same logic states. The IIC stop condition occurs when the inversion SDA_n of the signal on the SDA line of the IIC Bus transitions to logic low and the signal on the SCL line of the IIC Bus remains logic high. The multiplexor 116 will select the inversion 118 of the signal 114 output from the Reg1 flip-flop 112 for application to the data input of the Reg0 flip-flop 108. The multiplexor 122 will select the output from the Reg0 flip-flop 108 for application to the data input of the Reg1 flip-flop 112. When the SDA signal transitions to logic high, the data value at the input of the Reg0 flip-flop 108, which is the opposite logic value of the signal 114, is passed through to the signal 110. The XOR gate 106 responds to this condition by generating a logic high value for STOPx, and the AND gate 102 responds (after inversion 104) by pulling the START signal to logic low. Conversely, when the SDA_n signal transitions to logic high, the data value at the input of the Reg1 flip-flop 112, which is equal to the logic value of the signal 110, is passed through to the signal 114. The XOR gate 106 responds to this condition by generating a logic low value for STOPx. After inversion 104, this enables the AND gate 102 to pass the STARTx signal through as the START signal.

When the signal on the SCL line of the IIC bus transitions to logic low, the multiplexor 116 selects the signal 110 output from the Reg0 flip-flop 108 for input back to the Reg0 flip-flop 108 to effectively latch the data state of the signal 110 until the signal on the SCL line of the IIC Bus next transitions back to logic high. Likewise, the multiplexor 122 selects the signal 114 output from the Reg1 flip-flop 112 for input back to the Reg1 flip-flop 112 to effectively latch the data state of the signal 114 until the signal on the SCL line of the IIC Bus next transitions back to logic high.

The references "LA" and "LB" in FIG. 4 represent signals having any logic value (high or low). In this context, LA may have the same logic value as LB or LA may have the opposite logic value as LB. The symbol "~" indicates an inverted logic value.

Figure 5:
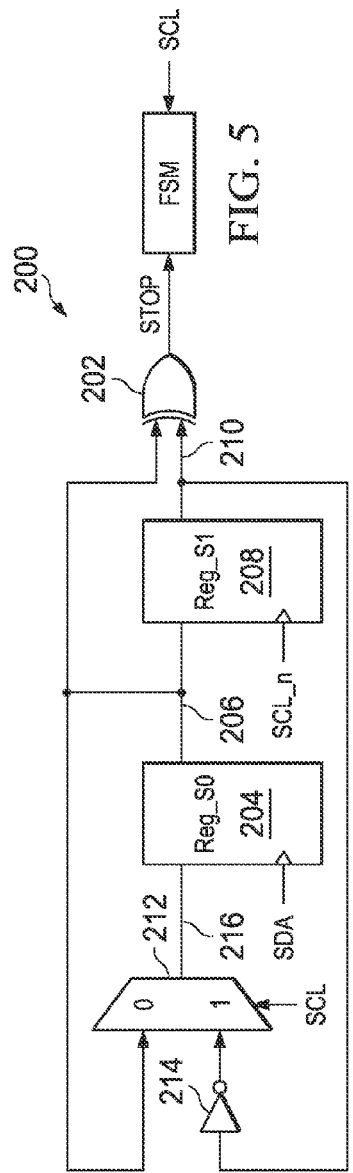
FIG. 5 is a circuit diagram for a stop condition detection circuit.

Reference is now made to FIG. 5 wherein there is shown a circuit diagram for a stop condition detection circuit 200.

The STOP signal is generated by a logic XOR gate 202. A finite state machine (FSM) is configured to receive the STOP signal as well as the signal on the SCL line of the IIC Bus. At the falling edge of the SCL signal, the FSM will check the logic state of the STOP signal. When the STOP signal is logic high at the falling edge of the SCL signal, the FSM detects a stop condition.

A flip-flop 204 (Reg_S0) has a data output (Q) supplying a signal 206 applied to a first input of the XOR gate 202. A flip-flop 208 (Reg_S1) has a data output (Q) supplying a signal 210 applied to a second input of the XOR gate 202. The Reg_S0 flip-flop 204 is clocked by the signal on the SDA line of the IIC Bus, and the Reg_S1 flip-flop 208 is clocked by the inversion SCL_n of the signal on the SCL line of the IIC Bus. The signal 206 output from the Reg_S0 flip-flop 204 is applied to the data input of the Reg_S1 flip-flop 208.

A multiplexor 212 has a first input configured to receive the signal 206 and a second input configured to receive an inversion 214 of the signal 210. The multiplexor 212 generates an output signal 216 applied to the data input of the Reg_S0 flip-flop 204. The multiplexor 212 functions to select either the signal 206 or the inversion 214 of the signal 210 for output as the output signal 216 in response to a select signal. The select signal is the signal on the SCL line of the IIC Bus.

Figure 6:
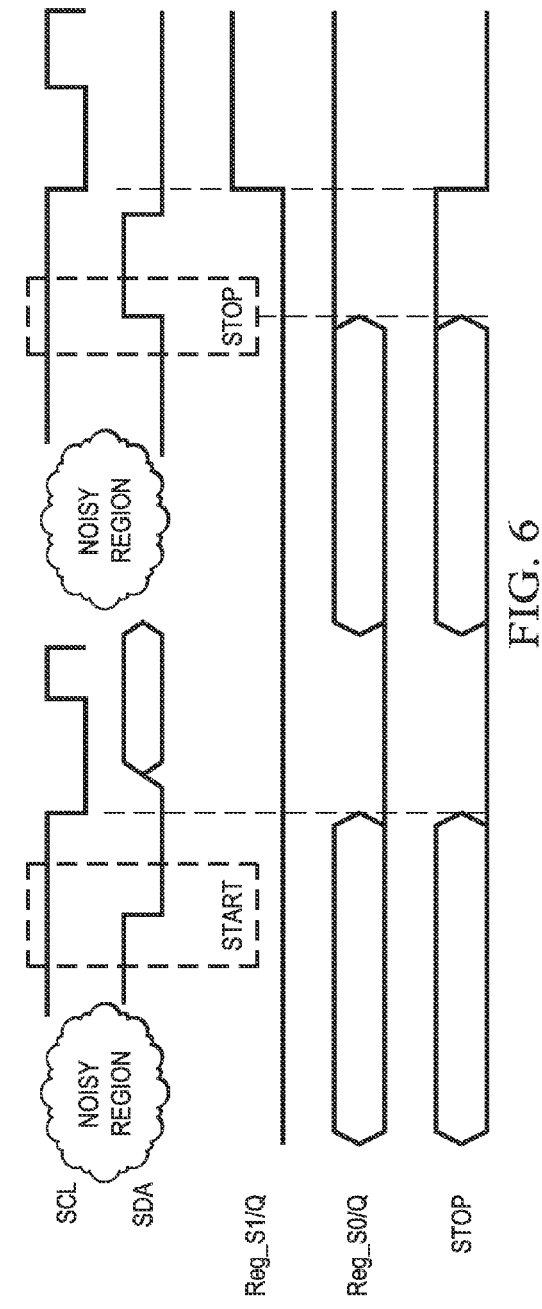
FIG. 6 illustrates a timing diagram for operation of the stop condition detection circuit of FIG. 5.

In operation of the circuit 200, the flip-flops 204 and 208 are reset to output a logic low signal at power-up. A power on reset (POR) circuit, not shown but well known to those skilled in the art, can be used to generate a reset signal for application to a reset input (not shown) associated with each of the flip-flops 204 and 208. Reference is now made to FIG. 6 which illustrates a timing diagram for operation of the circuit 200 of FIG. 5.

The IIC stop condition occurs when the inversion SDA_n of the signal on the SDA line of the IIC Bus transitions to logic low and the signal on the SCL line of the IIC Bus remains logic high. The multiplexor 212 will select the inversion 214 of the signal 210 output from the Reg_S1 flip-flop 208 for application to the data input of the Reg_S0 flip-flop 204. The transition of the SDA signal to logic high clocks the Reg_S0 flip-flop 204 and causes the signal 206 to have an opposite logic state from the signal 204. The XOR gate 202 responds to this input condition by generating the STOP signal having a logic high data state. At the next trailing edge of the SCL line of the IIC Bus, the Reg_S1 flip-flop 208 is clocked and the signal 210 will have the same logic state as the signal 206. The XOR gate 202 responds to this input condition by generating the STOP signal having a logic low data state. With the signal on the SCL line of the ICC bus at logic low, the multiplexor 212 selects the signal 206 output from the Reg_S0 flip-flop 204 for input back to the Reg_S0 flip-flop 204 to effectively latch the data state of the signal 206 until the signal on the SCL line of the IIC Bus next transitions back to logic high.

Although a specific logic circuit configuration is illustrated in FIGS. 2 and 5, it will be understood that those skilled in the art could design different logic circuitry to accomplish the same logical operations, processes and results.

It will be understood that the SMBus is similar in configuration and operation to the IIC Bus. Indeed the IIC Bus and the SMBus, although defined by different specifications, follow the same protocol. As a result, the reference herein to the IIC Bus will be understood to also refer to the SMBus, and the circuitry and operation described herein for making start/stop condition detection is equally applicable to electronic components connected to the SMBus.

An advantage of the disclosed circuitry is that the stop and start detection circuits rely solely on input from SDA and SCL. In other words, it will be noted that neither the start circuit nor the stop circuit receives another digital clock signal as an input. Such another digital clock signal may comprise, for example, a system clock or processor clock. This is advantageous over prior art circuit designs because the start and stop detection circuits are thus operable in the absence of a running another digital clock signal. So, if the another digital clock signal is paused, for example because the system is currently configured in sleep mode, the disclosed start and stop circuits remain active and ready to signal start/stop conditions in response to changes on the SDA and SCL lines.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A circuit, comprising:
   a first input configured to receive an SDA signal;
   a second input configured to receive an SCL signal;
   a first logic circuit configured to generate a first signal having a first logic state in response to a rising edge of the SCL signal;
   a second logic circuit configured to invert the first signal and generate a second signal having a second logic state in response to a falling edge of the SDA signal; and
   a third logic circuit operable responsive to the first logic state of the first signal and second logic state of the second signal to generate a start signal indicative of a start condition on a bus comprising the SDA and SCL signals.

2. The circuit of claim 1, wherein the first logic circuit is a first flip-flop circuit clocked by the SCL signal.

3. The circuit of claim 2, wherein the second logic circuit is a second flip flop circuit clocked by an inversion of the SDA signal.

4. The circuit of claim 3, wherein the second logic circuit further comprises a multiplexing circuit having a first input coupled to receive the inverted first signal and having a selection functionality controlled by the SCL signal.

5. The circuit of claim 4, wherein the multiplexing circuit further comprises a second input coupled to receive the second signal.

6. The circuit of claim 3, wherein the second signal output from the second flip-flop is input to the first flip-flop.

7. The circuit of claim 1, further comprising a fourth logic circuit coupled to receive an enable signal and the start signal, said fourth logic circuit configured to pass the start signal in response to said enable signal.

8. The circuit of claim 7, further comprising an additional logic circuit configured to generate the enable signal in response to said SDA and SCL signals.

9. The circuit of claim 8, wherein the additional logic circuit comprises:
   a fifth logic circuit configured to generate a fifth signal having a first logic state in response to a falling edge of the SDA signal;
   a sixth logic circuit configured to invert the fifth signal and generate a sixth signal having a second logic state in response to a rising edge of the SDA signal; and
   a seventh logic circuit operable responsive to the fifth and sixths signals to generate said enable signal.

10. The circuit of claim 9, wherein the fifth logic circuit is a fifth flip-flop circuit clocked by an inversion of the SDA signal.

11. The circuit of claim 10, wherein the fifth logic circuit further comprises a fifth multiplexor having a first input coupled to receive the fifth signal and a second input coupled to receive the sixth signal and having a selection functionality controlled by the SCL signal.

12. The circuit of claim 10, wherein the sixth logic circuit is a sixth flip-flop circuit clocked by the SDA signal.

13. The circuit of claim 12, wherein the sixth logic circuit further comprises a sixth multiplexor having a first input coupled to receive the sixth signal and a second input coupled to receive the inverted fifth signal and having a selection functionality controlled by the SCL signal.

14. The circuit of claim 1, further comprising a finite state machined coupled to receive the start signal and the SCL signal, the finite state machine configured to check the logic state of the start signal at the rising edge of the SCL signal.

15. A circuit, comprising:
   a first input configured to receive an SDA signal;
   a second input configured to receive an SCL signal;
   a first logic circuit configured to generate a first signal having a first logic state in response to a falling edge of the SCL signal;
   a second logic circuit configured to invert the first signal and generate a second signal having a second logic state in response to a rising edge of the SDA signal; and
   a third logic circuit operable responsive to the first logic state of the first signal and second logic state of the second signal to generate a stop signal indicative of a stop condition on a bus comprising the SDA and SCL signals.

16. The circuit of claim 15, wherein the first logic circuit is a first flip-flop circuit clocked by an inversion of the SCL signal.

17. The circuit of claim 16, wherein the second logic circuit is a second flip flop circuit clocked by the SDA signal.

18. The circuit of claim 17, wherein the second logic circuit further comprises a multiplexing circuit having a first input coupled to receive the inverted first signal and having a selection functionality controlled by the SCL signal.

19. The circuit of claim 18, wherein the multiplexing circuit further comprises a second input coupled to receive the second signal.

20. The circuit of claim 17, wherein the second signal output from the second flip-flop is input to the first flip-flop.

21. The circuit of claim 15, further comprising a finite state machined coupled to receive the stop signal and the SCL signal, the finite state machine configured to check the logic state of the stop signal at the falling edge of the SCL signal.

22. A circuit, comprising:
- a first input configured to receive an SDA signal;
- a second input configured to receive an SCL signal;
- a first circuit configured to sense a rising edge of the SCL signal and generate a first signal;
- a second circuit configured to sense a falling edge of the SDA signal and pass an inversion of the first signal as a second signal; and
- a logic circuit configured to logically combine the first and second signals to generate a start condition signal for a bus comprising the SDA and SCL signals.

23. The circuit of claim 22, further comprising an enable circuit configured to enable passing of the start condition signal, said enable circuit comprising:
- a third circuit configured to sense a falling edge of the SDA signal and generate a third signal;
- a fourth circuit configured to sense a rising edge of the SDA signal and an inversion of the third signal as a fourth signal; and
- an additional logic circuit configured to logically combine the third and fourth signals to generate said enable signal.

24. A circuit, comprising:
- a first input configured to receive an SDA signal;
- a second input configured to receive an SCL signal;
- a first circuit configured to sense a falling edge of the SCL signal and generate a first signal;
- a second circuit configured to sense a rising edge of the SDA signal and pass an inversion of the first signal as a second signal; and
- a logic circuit configured to logically combine the first and second signals to generate a stop condition signal for a bus comprising the SDA and SCL signals.

25. A circuit, comprising:
- a first input configured to receive an SDA signal;
- a second input configured to receive an SCL signal;
- a start/stop condition detection circuit coupled to receive the SDA and SCL signals and configured to:
  - generate a first signal in response to an edge of the SDA signal;
  - generate an inversion of the first signal as a second signal in response to an opposite edge of the SCL signal; and
  - logically combine the first and second signals to generate an output signal indicative of start/stop condition detection.

26. The circuit of claim 25, wherein the particular directions of the edges of the SDA and SCL signals that the start/stop condition detection circuit is response to determines whether the output signal is indicative of a start condition detection or a stop condition detection.

* * * * *